United States Patent Office 3,196,064
Patented July 20, 1965

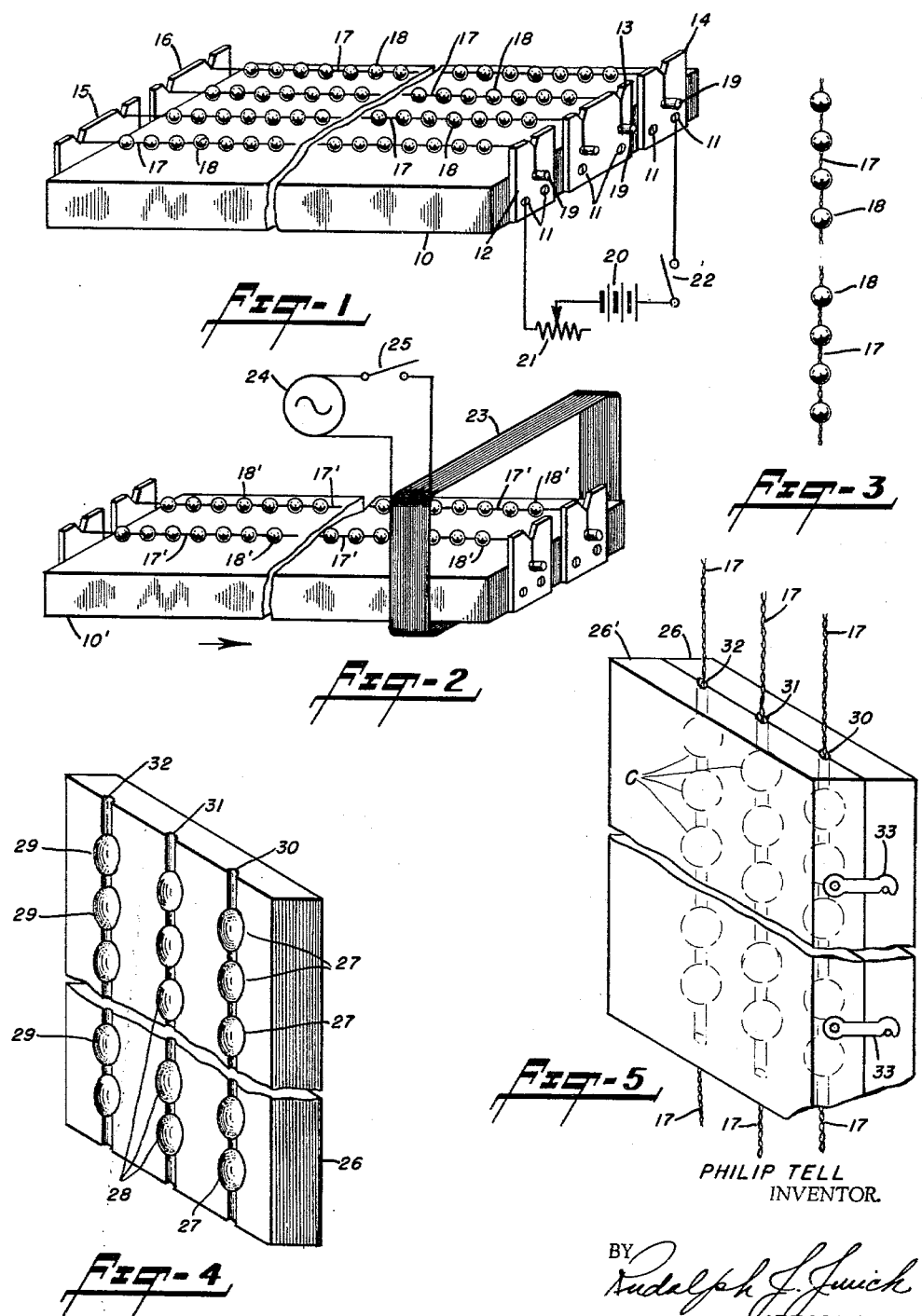

3,196,064
METHOD AND APPARATUS FOR THE
MANUFACTURE OF BEADS
Philip Tell, Summit, N.J., assignor to Tell Manufacturing Company, Inc., Orange, N.J., a corporation of New Jersey
Filed Dec. 14, 1962, Ser. No. 244,710
11 Claims. (Cl. 156—272)

This invention relates to a method and means for manufacturing beads and more particularly to the manufacture of plastic beads of the coated type.

In the manufacturing of plastic beads, such as are used in necklaces, bracelets, etc., the individual beads are first formed of a suitable plastic material, as by molding, each bead having an axial hole extending therethrough. To form imitation pearl beads, the plastic beads then are subjected to a chemical coating process, known as pearlizing, whereby a thin pearl-like coating is formed on the entire surface of the bead. In such coating operation, the individual beads must be prevented from contacting each other, or other surface, in order to provide a smooth, uniform coating of pleasing appearance without blemishes. Heretofore, the coating operation has been costly and resulted in a high percentage of rejects. To suspend each bead individually in the coating solution is a time-consuming and costly procedure. On the other hand, to suspend hundreds of beads in the coating solution in spaced-apart relation during the entire coating cycle presents a problem, particularly since the beads must be moved continuously as the coating is built up thereon.

The present invention is directed to a simple, efficient, practical arrangement for temporarily securing a plurality of beads in spaced-apart relation along a flexible wire. Such string of beads is then suspended in a coating solution to form a uniform, unblemished coating on each and every bead. After the coating operation, the individual beads are easily removed from the wire without damage to the overlying coating.

An object of this invention is the provision of an improved method useful for coating plastic beads.

An object of this invention is the provision of an arrangement for retaining a plurality of plastic beads in spaced-apart relation during the process of forming a coating thereon.

An object of this invention is the provision of a method and apparatus for temporarily attaching a plurality of plastic beads in spaced-apart relation on a supporting wire by the application of localized heat.

An object of this invention is the provision of apparatus for use in the manufacture of coated, plastic beads, which apparatus comprises means for positioning a plurality of plastic beads in spaced-apart relation on a wire and means for locally heating interior portions of each bead whereby, upon subsequent cooling, the beads are temporarily attached to the wire.

These and other objects and advantages of the invention will become apparent from the following description when taken with the accompanying drawings, illustrating several embodiments thereof. It will be understood, however, that the drawings are for purposes of illustration and are not to be construed as defining the scope or limits of the invention, reference being had for the latter purpose to the appended claims.

In the drawings wherein like reference characters denote like parts in the several views:

FIGURE 1 is an isometric view showing one arrangement for securing plastic beads in spaced-apart relation on a supporting wire in accordance with this invention;

FIGURE 2 is a somewhat similar view showing another embodiment of the invention;

FIGURE 3 shows a strand of beads secured to the wire after being processed in accordance with this invention; and FIGURES 4 and 5 are isometric views showing a fixture to facilitate stringing the beads on the supporting wire and maintaining the beads in spaced-apart relation thereon prior to the heating step.

Reference, now, is made to FIGURE 1, wherein there is shown a base 10, made of a suitable insulating material such as wood or plastic. Secured to one end of the base, as by screws 11, are metallic support plates 12, 13 and 14 having notches formed in the upper edges, as shown. The metallic support plates 15 and 16 are similarly secured to the opposite end of the base. The notches, or grooves, formed in the support plates, are adapted to receive the wires 17, each wire having strung thereon, in spaced apart relation, a plurality of plastic beads 18. Such beads are made on a mass production basis by means of multi-cavity molds with the central hole formed in each bead during the molding operation.

The beads are first strung on the individual wires and the ends of each wire are then entwined about suitable metal pins 19 which are secured to the support plates. Each wire is drawn taut to prevent the beads from sliding into contact with each other after the beads have been spaced apart, as shown. It will be noted that the terminal support plates 12 and 14 are each provided with a single notch to accommodate a single wire. On the other hand, the remaining support plates 13, 15 and 16 each are provided with two notches. It is apparent, therefore, that the several wires are electrically connected in series between the terminal support plates 12 and 14, which plates are connected to an electrical circuit comprising a voltage source 20, an adjustable resistor 21 and a switch 22.

The closure of the switch 22 completes the electrical circuit between the battery and the series-connected, taut wires 17. The magnitude of the current flowing through the wires is adjusted such that the wires become heated to the softening temperature of the bead material. Preferably, the wires 17 are of the stranded type and of a diameter considerably less than the internal diameter of the holes in the beads. Thus, each bead will be in contact with the supporting wire at relatively few points throughout the length of the bead. The surface of the plastic softens at these contact points whereby, upon cooling (opening of the electrical circuit), each bead becomes temporarily fused, or tacked, to the supporting wires.

Although the joint between each of the beads and the supporting wire is of a temporary character, the strings of beads can be removed from the fixture and subjected to normal handling without loss of the spacing between adjacent beads, as shown, for example, by the vertical string of beads in FIGURE 3. A plurality of such strings of beads can then be suspended in the coating solution from a suitable support which is power activated to maintain the beads in motion throughout the bead-coating operation. Alternatively, the assembly shown in FIGURE 1 may be disconnected from the external electrical circuit and the base 10, carrying the wires and beads, can be immersed in the coating solution with motion imparted thereto by suitable drive means. In any event, after the desired coating has been formed on the beads, they are removed from the solution, dried and readily separated from the supporting wire simply by pulling on one end of the wire while restraining the forward bead, as by means of one's fingers or by means of a fixture having a V-shaped notch formed therein.

The temporary tacking, or fusion, of the individual beads to the supporting wire can also be effected by induction heating, as shown in FIGURE 2. Here, the base 10' carrying the taut, stranded wires 17' and the spaced beads 18', is passed through a coil 23, which is energized by a high frequency current from a suitable source 24 upon closure of the switch 25. As the base is passed through the coil, the beads are subjected to a high frequency field whereby the interior of such beads and the supporting section of the wire are heated locally. The magnitude of the current flowing through the coil and the velocity at which the base is caused to pass through the coil are predetermined such that the wall defining the opening in the bead is softened. Shortly after the beads pass out of the field of influence of the radio frequency field, the softened surface of the bead hardens thereby effecting the temporary attachment of the bead to the wire. It is apparent that the beads need not be passed through a coil, as specifically shown in FIGURE 2. The current-carrying coil may be disposed above or below the board 10' to effect an internal heating of the beads.

In the arrangements described to this point, the beads are spaced apart on the supporting wires by hand. The bead spacing need not be uniform, it being only necessary to retain the beads in spaced-apart relation to prevent contact between adjacently-disposed beads during the coating operation.

An arrangement to facilitate the stringing of the beads on the supporting wires, while simultaneously spacing the beads thereon, will now be described with specific reference to FIGURES 4 and 5. FIGURE 4 illustrates a plate 26, made of insulating material, such as wood or plastic, having a plurality of vertically-aligned, hemispherical cavities 27–29 formed therein. The individual cavities of each row are interconnected by the associated grooves 30–32, each groove having a semi-circular cross section, and the center axis of each groove coinciding with that of the associated cavities. When two such plates are assembled together, as shown by the plates 26 and 26', in FIGURE 5, the grooves 30–32 form circular channels interconnecting spherical cavities C along a common center line. The diameter of the channels is somewhat larger than those of the wires 17, upon which the beads are to be strung, and the diameter of the spherical cavities is slightly greater than that of the particular beads.

In use, one of the plates, say the plate 26 shown in FIGURE 4, is placed in a trough, inclined at a small angle, and covered with beads from a supply hopper. Upon raising the plate, while imparting an oscillatory, or vibratory, motion thereto, each semi-spherical cavity will contain a bead. Such loaded plate is placed upon a table, the matching plate is placed thereover, and the two plates are clamped together, as by means of the pivotal clamps 33, thereby confining the beads within the spaced-apart cavities. The assembly is then placed in a vertical position and the ends of the wires 17 inserted into the channels from the top. Although each of the wires is made of relatively thin, stranded, filaments, the wires are sufficiently rigid so that they can be suspended from their upper ends in a substantially straight line by means of a suitable fixture, which fixture, at the same time, permits a downward displacement of the wires under the force of gravity. The assembly is now vibrated whereby the individual beads rotate haphazardly within their spherical chambers. As the axial holes in the upper beads become aligned with the end of the associated wire, such wire, under the combined action of vibration and gravity, passes through such bead and on to the next. Within a relatively short time, the wires protrude from the bottom of the assembly, at which time, obviously, the beads are strung on the wires.

The beads can now be secured to the wires by twisting the upper ends of appropriate wires together, similarly twisting together the lower ends of appropriate wires, and passing an electrical current through the series-connected wires, as has been described with reference to FIGURE 1. In this instance, it is preferable to place the assembly in a horizontal position so that the beads will rest upon the supporting wires to assure the transfer of heat from the wire to the engaged walls defining the axial hole in each bead. Alternatively, the assembly shown in FIGURE 5 can be passed through above or below an induction heating coil, as has been described with reference to FIGURE 2. In either case, the assembly can be moved about at will, as there is no possibility of losing the bead spacing as long as the two plates 26 and 26' remain clamped together. Once the beads have been attached to the wires, the bead strings can be removed and subjected to the coating process.

Having now described my invention, those skilled in this art will be able to make various changes and modifications in the illustrated and described arrangements. In practice, the supporting bases shown in FIGURES 1 and 2, and the plates shown in FIGURES 4 and 5 are considerably larger than shown so that many hundreds of beads can be processed in one operating cycle. The manner of establishing the electrical connection between the wires (which pass through the beads) and the electrical circuit is subject to considerable latitude. Changes and modifications of this character are intended to fall within the scope and spirit of the invention as recited in the following claims.

I claim:

1. In the manufacture of beads, the method which comprises stringing a plurality of thermoplastic beads on a metallic wire in spaced-apart relation, and applying heat to the wire to only slightly soften the interior surfaces of the beads at points which are in engagement with the wire, whereby upon subsequent cooling the beads will be lightly fastened to but readily removable from the wire.

2. In the manufacture of thermoplastic beads, the method which comprises stringing the beads on a metallic wire in spaced-apart relation; orienting the wire so that the beads are supported by the wire; and passing an electric current through the wire to only slightly soften the interior surfaces of the beads which are in contact with the wire, whereby they are easily removable therefrom.

3. In the manufacture of thermoplastic beads, the method which comprises stringing a plurality of such beads on a metallic wire in spaced-apart relation, and subjecting the beads and wire to a high frequency field to by induction only slightly soften the interior surfaces of the beads which are in contact with the wire, whereby they are easily removable therefrom.

4. In the manufacture of thermoplastic beads, the method comprising placing such a bead into each of a plurality of vertically-aligned spherical cavities which cavities are interconnected by a vertical channel, placing an end of a metallic wire into the channel, vibrating the beads and the wire to effect a passage of the wire sequentially through the hole of each bead, and momentarily heating the wire and thereby the interior surface of each bead to effect only a slight softening of the bead material at points which contact the wire, so that the beads are thereafter readily removable therefrom.

5. The invention as recited in claim 4 wherein the heating of the interior surface of each bead is effected by passing an electrical current through the wire.

6. Apparatus for use in the manufacture of beads comprising,
   (a) a metallic wire,
   (b) means for supporting a plurality of thermoplastic beads on the wire and in spaced-apart relation, and
   (c) means for locally heating the interior surface of each bead at points where the beads contact the wire to effect only temporary attachment therebetween.

7. The invention as recited in claim 6 wherein the means for locally heating the interior surface of each bead is a source of electrical potential connected to the ends of the wire, and including means to adjust the magnitude of the current flowing through the wire.

8. The invention as recited in claim 6, wherein the means for locally heating the interior surfaces of the beads is a coil positionable proximate to the beads, said coil being connected to a source of high frequency current.

9. Apparatus for use in the manufacture of beads comprising,
   (a) a metallic wire upon which a plurality of thermoplastic beads are strung,
   (b) means for retaining the beads in spaced-apart relation on the wire, and
   (c) means heating the interior surfaces of the beads to only the softening temperature of the bead material, so that said beads are thereafter readily removable.

10. The invention as recited in claim 9, wherein the means heating the interior surfaces of the beads comprises a source of electric current connected to the ends of the wire.

11. Apparatus for use in the manufacture of thermoplastic beads comprising,
    (a) a pair of matching plates, each plate having formed in a surface thereof aligned semi-spherical cavities interconnected by a groove,
    (b) means for securing the plates together such that the matching semi-spherical cavities form spherical cavities for accommodating individual beads and the matching grooves form a channel,
    (c) a metallic wire passing through the channel and through thermoplastic beads disposed in the spherical cavities,
    (d) a source of electrical voltage, and
    (e) circuit elements for connecting the ends of the wire to the source of voltage and controlling the resulting current, so that the beads are only temporarily attached to the wire and subject to easy removal upon the application of slight force tending to slide the beads on the wire.

References Cited by the Examiner
UNITED STATES PATENTS

| | | | |
|---|---|---|---|
| 2,397,471 | 4/46 | Cox | 156—272 |
| 2,713,017 | 7/55 | Bruns | 156—275 |
| 2,983,306 | 5/61 | Resnick | 156—380 |

EARL M. BERGERT, *Primary Examiner.*